G. CLAUDE.
PROCESS FOR THE MANUFACTURE OF COMPRESSED HYDROGEN.
APPLICATION FILED MAR. 14, 1918.
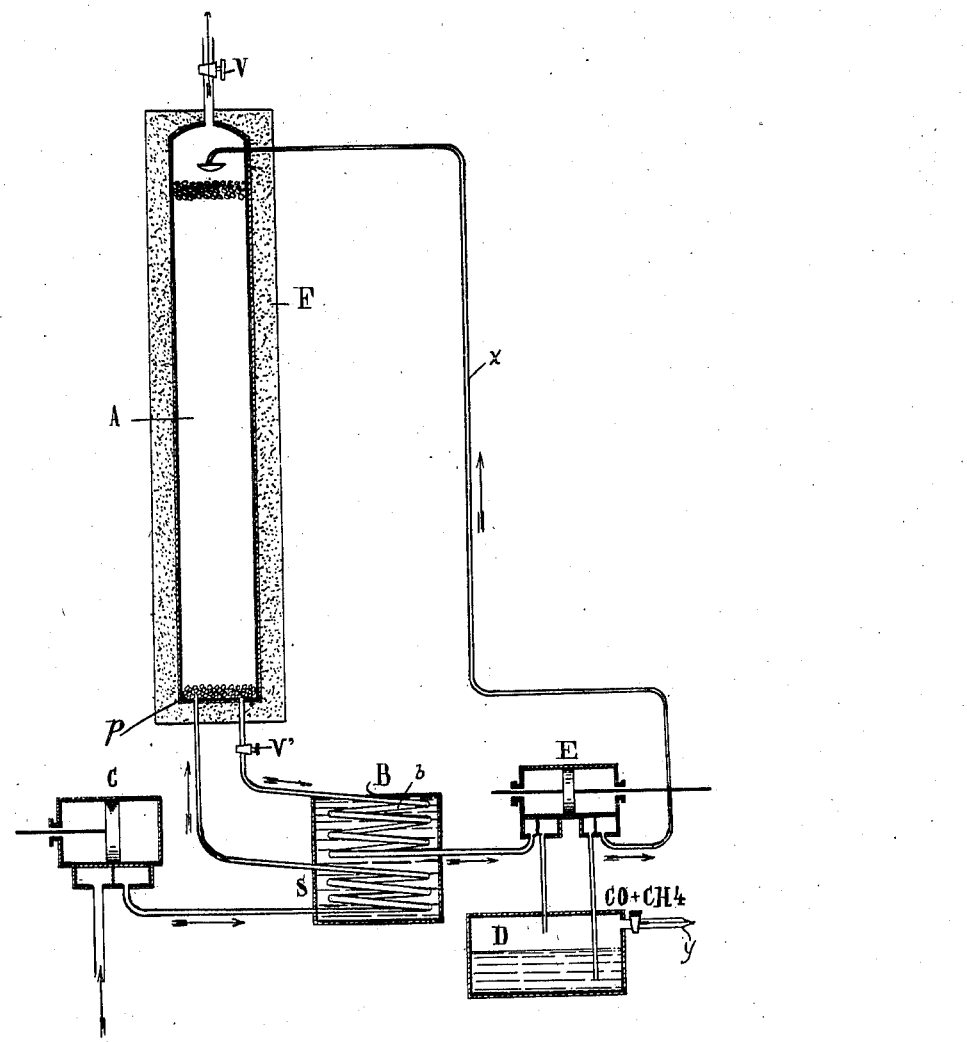

Patented Dec. 12, 1922.

1,438,581

UNITED STATES PATENT OFFICE.

GEORGES CLAUDE, OF PARIS, FRANCE, ASSIGNOR TO L'AIR LIQUIDE SOCIETE ANONYME POUR L'ETUDE ET L'EXPLOITATION DES PROCEDES GEORGES CLAUDE, OF PARIS, FRANCE.

PROCESS FOR THE MANUFACTURE OF COMPRESSED HYDROGEN.

Application filed March 14, 1918. Serial No. 222,505.

*To all whom it may concern:*

Be it known that I, GEORGES CLAUDE, a citizen of the French Republic, residing at 48 Rue St. Lazare, Paris, in the Republic of France, have invented certain new and useful Processes for the Manufacture of Compressed Hydrogen, of which the following is a specification.

This invention relates to the recovery of hydrogen from gaseous mixtures, particularly from such as contain carbon monoxide in admixture with the hydrogen, and has for its primary object the accomplishment of the desired object in a simple, inexpensive and commercially practicable manner.

In an application Serial No. 222,503, filed March 14, 1918, I have described a process of separating hydrogen from gaseous mixtures, which consists in submitting the mixture under a very high pressure, from 400 to 1,000 atmospheres to contact with a single liquid which dissolves, in one operation, all of the gas other than hydrogen. Further researches undertaken in this direction have disclosed the invention which is the subject matter of the present application.

In the industrial gaseous mixtures in question containing a rather high proportion of hydrogen, such as water gas, lighting gas and coke oven gas, the hydrogen is the least soluble of all of the gases present with the exception of phosphoretted hydrogen. The hydrocarbons, principally methane, are comparatively soluble in the liquids in question. Among the other gases contained in these mixtures, the most important is carbon monoxide. It is necessary, to accomplish the separation of carbon monoxide from hydrogen, to find liquids and conditions of employing these liquids, such that the solubility of the carbon monoxide will be as relatively high as possible and that of hydrogen, as low as possible; that is to say, such, that the liquid selected will be a good solvent of carbon monoxide, and that it will have a ratio of the coefficient of solubility of carbon monoxide to that of hydrogen, $$\frac{S(CO)}{S(H)},$$

as high as possible. The coefficients of solubility are defined herein as the following ratio: as the numerator, the volume of gas dissolved taken at the partial pressure of that gas in the compressed gaseous mixture, that pressure being calculated on presuming the gaseous mixture to follow the law of Mariotte and Boyle: as the denominator, the volume taken at 15° C. and atmospheric pressure, of the liquid in which the volume of gas above defined is dissolved.

Experiments, carried out by the inventor, have shown that, while the quantities of carbon monoxide and of hydrogen which are dissolved from a mixture of these two gases, increase nearly proportionally with the pressure on liquids, such as methyl and ethyl alcohol, acetone, ethyl and butyl acetates and benzene, described in the application above referred to, in other liquids, such as ordinary or ethyl ether, the coefficient of solubility of hydrogen increases with the pressure and more rapidly than that of the carbon monoxide. For example, with ordinary ether the co-efficient of solubility at 20° C. of the hydrogen contained in a mixture having 50% by volume of carbon monoxide and a corresponding quantity of hydrogen, is substantially 0.12 under 100 atmospheres, and substantially 0.30 under 1,000 atmospheres. Under the same conditions, the co-efficient of solubility of carbon monoxide varies from 0.45 to 0.53. This constitutes an unexpected and surprising fact, particularly since it was believed that the coefficients remain practically constant as the pressure varies. (The coefficients of solubility for the mixed gases are, moreover, very different from those of carbon monoxide and of hydrogen taken separately.) It follows from the foregoing discussion that, for the liquids such as ordinary ether, the ratio of coefficients of solubility $$\frac{S(CO)}{S(H)}$$

of a mixture of hydrogen and carbon monoxide diminishes in proportion as the pressure increases toward very high values.

The ratio of the coefficients of solubility $$\frac{S(CO)}{S(H)}$$

of the mixture is therefore, less favorable at very high pressures to the method described in application No. 222,503, than would be desirable, and consequently the procedure in question would be difficultly applicable, especially at pressures above 600 to 800 atmospheres with liquids such as ordinary ether.

The present invention comprehends the utilization of these liquids at much lower pressures and under conditions favorable to the efficiency of the process. To this end, I utilize medium pressures in the neighborhood of 50 to 300 atmospheres, under which the quantity of dissolved gas is still important, but I no longer operate in the neighborhood of atmospheric temperature as before, but at a temperature much lower. It follows, as demonstrated, by experiments conducted by me, that contrary to ordinary laws of solubility of gases in liquids, the coefficients of solubility of hydrogen and of carbon monoxide at a given pressure, correspondingly decrease as the temperature is lowered toward the point of solidification of the liquids when the liquids, such as ether, have the property heretofore referred to, of a decrease of the ratio of coefficients of solubility $\frac{S(CO)}{S(H)}$ when the pressure increases.

But this coefficient of solubility decreases more rapidly for hydrogen than for carbon monoxide. Therefore, for a given pressure the ratio of coefficients of solubility $\frac{S(CO)}{S(H)}$ is much greater when the temperature is very low and the separation of these two gases will be thus more easily accomplished. With these liquids, in combining the use of a pressure sufficiently low and a temperature very low, I arrive at a satisfactory ratio of coefficients of solubility which could not have been predicted from the actual state of theoretical knowledge. It is thus that with ordinary ether at a temperature —40° C. and under a pressure of 100 atmospheres, the ratio of coefficients of solubility for the mixture of equal parts of carbon monoxide and hydrogen is substantially 5, depending on the purity of the solvent, and it reaches 6 at —60° C., while under the same pressure it is less than 4 at a temperature of +20° C.

The operation at the low temperature presents another interesting feature, however, because it lowers the vapor tension of the dissolving liquid and consequently the losses due to this factor, which result when the pressure on the liquid is diminished to release the dissolved gas. In this respect the present invention involves the following improvement.

In application No. 222,503, filed March 14, 1918, I have indicated that to decrease the losses of solvent, the separation of the dissolved gas could be accomplished, not at atmospheric pressure, but at a pressure intermediate between atmospheric and the pressure under which solution is carried out.

Following the present invention, I preferably accomplish the separation, not in a single stage but in several stages, two for example, and while dropping to atmospheric pressure, or even below by the creation of a partial vacuum.

It is easy to see by calculation that in operating as described, I obtain the advantages not only of separation under atmospheric pressure, but also of materially reducing the losses due to vapor tension.

Let Po be the pressure, expressed in atmospheres and calculated with reference to atmospheric pressure, under which we operate the solution, the reasoning being applied to a constant mass of gas which is dissolved in the solvent until saturation under Po. Let P be the pressure, calculated similarly to Po, to which the gas is released in the first stage and $t$ the vapor tension in atmospheres of the solvent at the temperature considered and presumed to be constant, this liquid remaining saturated with the gas under the pressure P.

We should assume, moreover, that the release of the gas occurs directly to atmospheric pressure. The gas dissolved in the liquid is released then under atmospheric pressure and it is accompanied by a certain quantity of the solvent in a vapor state. This gaseous mass occupies the volume V under atmospheric pressure. The corresponding volume of the vapor of the solvent is V$t$ taken at atmospheric pressure.

If, on the contrary, we accomplish the release in two stages, first from Po to P and then from P to atmospheric pressure, in the first stage, the pressure on the liquid drops from Po to P and the change of pressure is then Po—P. While in the preceding case when the change of pressure is Po, the total volume of gas released is V taken at atmospheric pressure, when the change of pressure is Po—P, the total volume of gas released under the pressure P, taken at atmospheric pressure, will be $\frac{(V \times Po - P)}{Po}$; under the pressure of P atmospheres this volume will be, assuming Mariotte's law to be applicable, $$\frac{V(Po-P)}{P \times Po}$$

and the volume of the vapor from the solvent will be $$\frac{V(Po-P) \times t}{P \times Po}$$

under atmospheric pressure.

In the second stage, when the pressure falls from P to atmospheric pressure, the total volume of gas discharged is, following an analogous reasoning to that preceding, $\frac{VP}{Po}$ and the volume of the vapor of the solvent taken at atmospheric pressure is $\frac{VPt}{Po}$.

The total loss of solvent in this case is then $$\frac{V(Po-P)}{P \times Po} \times t + \frac{VPt}{Po}.$$

This loss is evidently greater than the loss $$\frac{V(Po-P)t}{P \times Po}$$

in the case of a single release of pressure to the pressure P, but it is much less than the loss $Vt$ by release in one stage to atmospheric pressure.

If, for example, $Po$ equals 150 and P equals 30, we have, $$\frac{Vt}{P} + \frac{VPt}{Po} - \frac{Vt}{Po} = \frac{Vt}{30} + \frac{30Vt}{150} - \frac{Vt}{150}$$

or $$\frac{Vt}{30} + \frac{6Vt}{30} - \frac{Vt}{150} = \frac{7Vt}{30} - \frac{1}{150} = Vt$$

being a loss which is less than one fourth of that which would follow the separation by dropping abruptly to atmospheric pressure. The most advantageous value for P can be found by calculating the minimum value of the expression $$V\frac{Po-P}{P \times Po}t = \frac{VPt}{Po} \text{ or of } \frac{Vt}{P} - \frac{Vt}{Po} + \frac{VPt}{Po}$$

in which P is a variable. In equating the derivative to zero, we have $$-\frac{Vt}{P^2} + \frac{Vt}{Po} = 0, \frac{1}{P^2} = \frac{1}{Po}, \text{ or } P = \sqrt{Po}.$$

P is thus 12 atmospheres when $Po = 150$ atmospheres. The loss is then in the neighborhood of $\frac{Vt}{6}$ being ⅙ of what it would be by dropping abruptly to atmospheric pressure.

The drawing herewith, represents diagrammatically, by way of example, an apparatus adapted for use in carrying out the process described. It provides a compressor C in which the gaseous mixture to be treated is raised to the necessary pressure of treatment. A refrigerating compartment B is traversed by a coil S through which the mixture passes and in which it is cooled to the necessary low temperature. The mixture then enters the insulated tower A, heat insulated as indicated at F and filled with balls $p$ or with plates, where solution under pressure is carried out. To this end, the selected solvent, responding to the double condition of a good dissolving power for carbon monoxide and a good ratio of the coefficients of solubility at low temperature, is raised, cold and under pressure by the pump L to the top of the insulated tower A in which it descends in the inverse direction and in contact with the ascending gas. The hydrogen in a state of purity, except for the solvent carried away with it, if the condition of the respective deliveries and of temperature are satisfactory, separates at the regulating valve V. The saturated liquid, somewhat heated, by the formation of the solution and by the entrance of heat in spite of the insulation, passes the valve V' and enters a coil $b$ in the chamber B where it is cooled before abandoning its gas. Thus, when the ultimate separation of the gas produces in the liquid a fall of temperature, this cooling augments the cooling in B and compensates the excess elevation of temperature produced in A in forming the solution. The active cooling agent in the chamber B may be any external agent, for example, a brine from a refrigerating machine.

After its passage through B, the saturated liquid acts on one of the faces of a piston, in the motor-pump E, the other face of which raises, through a pipe X, some unsaturated liquid drawn from the receptacle D, into the upper part of the tower A. The alternate movement of the piston in E, controlled by means of slide valves, thus causes the entrance of the unsaturated liquid in the tower A without spending any motive power, except for slight losses which are compensated by a suitable addition of motive force. After acting in E, the liquid is diverted into the chamber D where it delivers its gas, under a pressure sufficiently high so that the loss of this liquid due to its vapor tension will be very small. This gas is principally, following the original assumption, carbon monoxide, or methane, with a slight proportion of hydrogen. It may be withdrawn at Y, put to any desired use and particularly to the production of the motive force necessary to the process and eventually to the heating of coke ovens and the like. From D the unsaturated liquid returns in the cycle being drawn up by E.

We may recover, if desired, the cold of the separated gas.

I claim:

1. Process of manufacturing compressed hydrogen by extraction from gaseous mixtures, which contain it with carbon monoxide, consisting in compressing the gaseous mixture to a pressure ranging from 50 to 300 atmospheres, circulating the gas at a temperature ranging from $-40°$ C. to $-60°$ C. in contact with a solvent, which absorbs in a single operation substantially all of the gas other than hydrogen, leaving the major part of said hydrogen in a state of substantial purity and compressed.

2. Process of manufacturing compressed hydrogen by extraction from gaseous mixtures, which contain it with carbon monoxide, consisting in circulating said mixture under a pressure ranging from 50 to 300 atmospheres and at a low temperature in contact with a solvent which absorbs in a single operation substantially all of the gases other than hydrogen, disengaging the gas from the saturated liquid in several stages under pressures decreasing from the initial pressure to atmospheric pressure, then returning the liquid, always at low temperature, to the contact chamber and under the initial pressure by utilizing the energy produced during the passage of the liquid from the initial pressure to atmospheric pressure.

3. Process of manufacturing compressed hydrogen by extraction from gaseous mixtures, which contain it with carbon monoxide, consisting in compressing the gaseous mixture to a pressure ranging from 50 to 300 atmospheres, cooling it to a temperature ranging from $-40°$ C. to $-60°$ C., circulating it at said temperature in contact with a solvent, which absorbs in a single operation substantially all of the gas other than hydrogen, cooling the liquid saturated with gas, separating the gas from the liquid by decreasing the pressure and returning the liquid, always at low temperature and under the initial pressure into the contact chamber.

4. Process of manufacturing compressed hydrogen by extraction from gaseous mixtures, which contain it with carbon monoxide, consisting in compressing the gaseous mixture to a pressure ranging from 50 to 300 atmospheres, cooling it to a temperature ranging from $-40°$ C. to $-60°$ C. by utilizing the cold of the separated gas, circulating it once at said temperature in contact with ethyl ether, extracting the dissolved gas from the saturated ether in two stages, first at a pressure intermediate between the initial pressure and atmospheric pressure then to atmospheric pressure, returning the ether, always at low temperature and under the initial pressure into the contact chamber by utilizing the energy developed during the passage of the liquid from the initial pressure to the intermediate pressure and from the intermediate pressure to atmospheric pressure.

GEORGES CLAUDE